United States Patent Office 3,197,282
Patented July 27, 1965

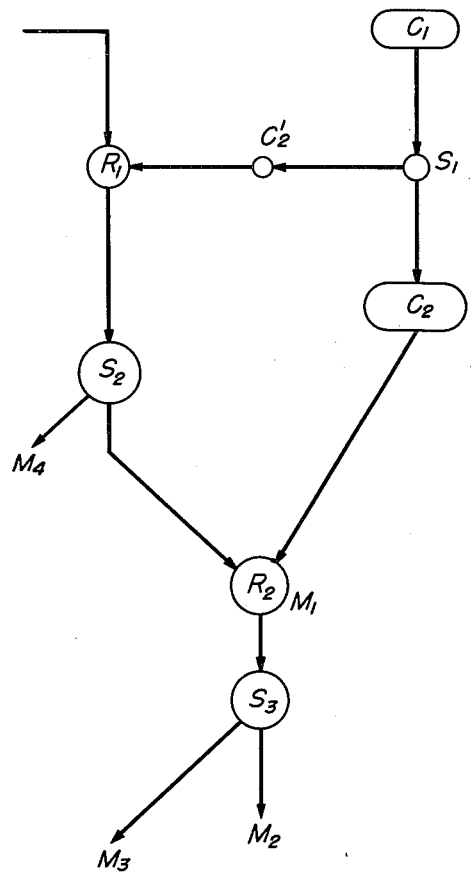

3,197,282
PROCESS FOR SIMULTANEOUSLY PRODUCING PURE AND CRUDE MAGNESIUM HYDROXIDE FROM SEA WATER
Tsuneo Kato, Iwaki-shi, Japan, assignor to Asahi Kasei Kogyo Kabushiki Kaisha, Kita-ku, Osaka, Japan, a corporation of Japan
Filed Jan. 17, 1962, Ser. No. 166,840
Claims priority, application Japan, Feb. 14, 1961, 36/5,010
2 Claims. (Cl. 23—201)

This invention relates to a process for the simultaneous production of pure and crude magnesium hydroxide from sea water. More particularly, this invention is concerned with the treatment of sea water to recover total magnesium components contained therein at a high efficiency and in economical manner.

It is an object of the present invention to provide for the recovery of the total magnesium components, a part of which is recovered as pure magnesium hydroxide and the other part of which is as crude magnesium hydroxide, from sea water by using impure alkali material. Other objects and advantages of the present invention will become apparent from the following description taken in conjunction with the attached drawing.

In the drawing, there is schematically shown flow diagram of one embodiment of the present invention.

According to the heretofore known method for recovering magnesium components from sea water, highly pure magnesium hydroxide can be obtained, but such method is commercially unacceptable because the alkali material used therein must be of rather high purity and hence it is costly.

In accordance with a method of the present invention, calcium carbide waste is used as alkali material, whereas slaked lime is used in the known method. As is well known, the calcium carbide waste is very inexpensive but contains many impurities. This means that there were many difficulties to be solved before the solution according to the present invention was achieved. Preliminary experiments were made to determine how carbide waste is different from slaked lime in chemical composition. The result is set forth in Table 1.

TABLE 1
*Comparison of calcium carbide waste and slaked lime*

| Components (Calculated as anhydride) | Calcium carbide waste | Slaked lime |
|---|---|---|
| CaO _____percent__ | 71.82 | 73.49 |
| $Al_2O_3$ _____do____ | 1.14 | 0.04 |
| $SiO_2$ _____do____ | 1.24 | 0.19 |
| $Fe_2O_3$ _____do____ | 0.17 | 0.09 |
| $Al_2O_3/CaO \times 100$ _____ | 1.56 | 0.05 |
| $SiO_2/CaO \times 100$ _____ | 1.76 | 0.26 |
| $Fe_2O_3/\times 100$ _____ | 2.36 | 0.12 |

The calcium carbide waste is too impure to use primarily for our purpose. We have now found that if the calcium carbide waste in milky state is separated into crude and pure portions, the former portion is usable for the removal of carbonic acid from sea water and the latter is for the formation of magnesium hydroxide by the reaction with carbonic acid-free sea water.

The present invention resides in a method for the recovery of magnesium hydroxide from sea water, characterized by the combination of the following steps, namely: the 1st step for sorting calcium carbide waste in milky state to provide separate crude and pure portions; the 2nd step for reacting sea water with the resulting crude portion of the calcium carbide waste to have carbonic acid-free sea water and precipitated mass; the 3rd step for reacting the carbonic acid-free sea water with the pure portion of the calcium carbide waste to form magnesium hydroxide, and the 4th step for fractionating the resulting magnesium hydroxide to recover crude magnesium hydroxide and pure magnesium hydroxide.

Now the present invention will be explained in details in connection with the flow diagram of the attached drawing. While a method of the present invention consists of four main steps, it is to be understood that some procedures may follow each of the main steps without departing from the scope of the invention.

(1) *The 1st step.*—Calcium carbide waste as raw material is prepared as an aqueous emulsion having a concentration of about 5–10%. The emulsion is introduced into mechanical separation means $S_1$ in which the emulsion is separated to provide a first pure calcium carbide waste portion $C_2$ having a larger particle size than that of the slaked lime generally used and a second crude calcium carbide waste portion $C_2'$ having a smaller particle size than that of the slaked lime. The portion $C_2$ is rather pure, but $C_2'$ portion contains considerable amounts of impurities having a smaller particle size than that of the slaked lime. The following table shows the average composition of the $C_2$ and $C_2'$ portions.

TABLE 2
*Components of calcium carbide waste portions after fractionation*

| Content (Calculated as anhydrous state) | Pure calcium carbide waste ($C_2$) | Impure calcium carbide waste ($C_2'$) |
|---|---|---|
| CaO _____percent__ | 72.61 | 70.76 |
| $Al_2O_3$ _____do____ | 1.04 | 1.56 |
| $SiO_2$ _____do____ | 0.94 | 1.67 |
| $Fe_2O_3$ _____do____ | 0.18 | 0.09 |
| $Al_2O_3/CaO \times 100$ _____ | 1.43 | 2.20 |
| $SiO_2/CaO \times 100$ _____ | 1.29 | 2.36 |
| $Fe_2O_3/CaO \times 100$ _____ | 0.25 | 0.13 |

The thus obtained $C_2$ and $C_2'$ portions may be either stored in storage vessels respectively or directly passed to the subsequent steps.

While the particular mechanical separations means is not within the purview of the present invention, it may be of the settling type or of the centrifugal type.

(2) *The 2nd step.*—Sea water, after it has been passed through a sand pool filter or other suitable equipment, is introduced into a reaction vessel $R_1$. Separately the impure calcium carbide waste portion $C_2'$ is introduced into the same vessel $R_1$ wherein reaction for the removal of carbonic acid from sea water takes place. The reaction mixture is separated by means of second separation means $S_2$ to provide impure precipitate $M_4$ and $CO_2'$ free sea water. The impure precipitate $M_4$ contains impurities having a greater particle size than that of slaked lime and non-hydrated quick lime, together with a large amount of magnesium hydroxide. The average composition is set forth in the following table.

TABLE 3
*Composition of the precipitate $M_4$ (calculated as anhydrous state)*

|  | Percent |
|---|---|
| CaO | 53.29 |
| MgO | 42.50 |
| $Al_2O_3$ | 1.94 |
| $SiO_2$ | 2.10 |
| $Fe_2O_3$ | 0.62 |

Usually, sea water contains about 80–90 p.p.m. of $CO_3^{--}$, but after the removal of carbonic acid therefrom, the sea water contains $CO_3^{--}$ in as little as 10–15 p.p.m. The object of this step is to provide carbonic acid-free sea water by the use of impure portion $C_2'$ of calcium carbide waste, said sea water being usable in the subsequent step.

(3) *The 3rd step (formation of magnesium hydroxide)*.—Into a reaction vessel $R_2$, the carbonic acid-free sea water having been treated in the preceding step is introduced and then the pure calcium carbide waste portion $C_2$ is introduced, thereby to cause a reaction. The precipitated reaction product $M_1$ is collected by filtration. It has the following composition on chemical analysis.

TABLE 4

*Composition of the reaction product $M_1$*
*(calculated as anhydrous state)*

| | | |
|---|---|---|
| MgO | Percent | 91.50 |
| CaO | do | 3.34 |
| $Al_2O_3$ | do | 1.46 |
| $SiO_2$ | do | 3.24 |
| $Fe_2O_3$ | do | 0.41 |
| CaO/MgO×100 | | 3.65 |
| $Al_2O_3$/MgO×100 | | 1.60 |
| $SiO_2$/MgO×100 | | 3.52 |
| $Fe_2O_3$/MgO×100 | | 0.45 |

As shown in Table 4, the precipitate has high contents of calcium oxide, alumina and other impurities and so it can not be used directly for the manufacture of high grade magnesia clinker. For this purpose, the precipitate must be purified.

(4) *The 4th step (purification of magnesium hydroxide)*.—The precipitate resulting from the reaction of the 3rd step is passed into mechanical separation means $S_3$ wherein the perecipitate is fractionated into pure magnesium hydroxide portion and crude magnesium hydroxide portion.

The separation means in this step does not perform chemical fractionation but employs mechanical fractionation as the 2nd separation means in the 2nd step does. The thus obtained pure and crude portions ($M_2$ and $M_3$) of magnesium hydroxide have the following chemical composition.

TABLE 5

*Composition of magnesium hydroxide portions*
*(calculated as anhydrous state)*

| | Pure portions ($M_2$) | Crude portion ($M_3$) |
|---|---|---|
| MgO percent | 94.37 | 86.01 |
| CaO do | 1.58 | 4.02 |
| $Al_2O_3$ do | 1.04 | 3.45 |
| $SiO_2$ do | 2.59 | 5.95 |
| $Fe_2O_3$ do | 0.32 | 0.67 |
| CaO/MgO×100 | 1.67 | 4.66 |
| $Al_2O_3$/MgO×100 | 1.20 | 4.01 |
| $SiO_2$/MgO×100 | 2.18 | 6.90 |
| $Fe_2O_3$/MgO×100 | 0.34 | 0.78 |

The obtained pure magnesium hydroxide portion is adaptable as high purity magnesium hydroxide and therefore it may be used as raw material for the manufacture of magnesia clinker and in the pulp industry. The crude magnesium hydroxide portions $M_3$ and $M_4$ are useful for the production of metallic magnesium by a reduction method or for the production of magnesium fertilizer.

EXAMPLE 181 m.³/hr. of an aqueous carbide waste lime emulsion (calculated as CaO: 13.09 tons) were separated into 150 m.³/hr. of a high purity portion (calculated as CaO: 11.90 tons) and 31 m.³/hr. of a low purity portion by means of a separating apparatus. Each of thus separated portions are used in subsequent respective steps.

First, 4.500 m.³/hr. of sea water (analysis: MgO=2.15 g./l., CaO=0.56 g./l.) having been sand filtered was poured into a reaction tank and 31 m.³/hr. of the low purity solution obtained in the foregoing step was charged therein to perform a decarbonizing reaction. After the reaction, the reaction product was subjected to separation in a separating apparatus to obtain 4,515 m.³/hr. of decarbonized sea water (calculated as MgO content of 8.68 tons, calculated as CaO: 3.15 tons) and 16 m.³/hr. of impure precipitate ($M_4$) (calculated as MgO: 1.00 tons, CaO: 0.56 ton).

Next, 4,515 m.³/hr. of said decarbonized sea water and 150 m.³/hr. of said high purity carbide waste lime liquid were charged into a magnesium hydroxide forming reaction vessel to carry out the reaction, whereby a precipitate of magnesium hydroxide was formed. Then, the reaction sea water was subjected to separation in the separating apparatus, whereby 4,573 m.³/hr. of effluent water (calculated as MgO: 0.75 ton CaO: 14.87 tons), 82 m.³/hr. of high purity magnesium hydroxide ($M_2$) (calculated as MgO: 7.18 tons, CaO: 0.10 ton) as a product and 10 m.³/hr. of crude magnesium hydroxide ($M_3$) (calculated as MgO: 0.75 ton, CaO: 0.08 ton), could be obtained separately.

The high purity magnesium hydroxide, $M_2$, will be used for magnesia clinker, while the crude magnesium hydroxide, $M_3$ and $M_4$, will be used for metallic magnesium material and fertilizer.

The analysis of $M_2$, $M_3$ and $M_4$ (calculated as anhydrous state) is set forth in the Table 6 as follows.

TABLE 6

*Composition of magnesium hydroxide portions*
*(calculated as anhydrous state)*

| Portion | ($M_2$) | ($M_3$) | ($M_4$) |
|---|---|---|---|
| Item: | | | |
| MgO (percent) | 94.87 | 80.84 | 61.03 |
| CaO (percent) | 1.32 | 8.62 | 34.18 |
| $Al_2O_3$ (percent) | 1.06 | 3.73 | 1.86 |
| $SiO_2$ (percent) | 2.40 | 6.10 | 2.50 |
| $Fe_2O_3$ (percent) | 0.35 | 0.71 | 0.43 |

What I claim is:

1. A method for the simultaneous production of pure and crude magnesium hydroxide from sea water, and method comprising mechanically fractionating calcium carbide waste in milky state to separate the wast into pure and crude fractions respectively constituted of relatively coarse and fine particle size, reacting the fine calcium carbide waste fraction with sea water to produce sea water substantially free from carbonic acid and a first precipitate containing magnesium hydroxide, reacting the pure calcium carbide waste fraction with the sea water which is substantially free from carbonic acid to form a second precipitate containing magnesium hydroxide, and mechanically fractionating the second precipitate to produce a first fraction containing substantially pure magnesium hydroxide and a second fraction containing crude magnesium hydroxide.

2. A method as claimed in claim 1, comprising combining the first precipitate and the said second fraction containing crude magnesium hydroxide.

References Cited by the Examiner

UNITED STATES PATENTS

| | | | |
|---|---|---|---|
| 2,089,339 | 8/37 | Chesny | 23—201 |
| 2,390,531 | 12/45 | Hansgirg | 23—201 X |
| 2,703,273 | 3/55 | Robertson et al. | 23—201 |
| 3,075,828 | 1/63 | Kato et al. | 23—201 |

MAURICE A. BRINDISI, *Primary Examiner.*